(12) United States Patent
Subramaniam et al.

(10) Patent No.: US 9,846,553 B2
(45) Date of Patent: Dec. 19, 2017

(54) ORGANIZATION AND MANAGEMENT OF KEY-VALUE STORES

(71) Applicant: Exablox Corporation, Sunnyvale, CA (US)

(72) Inventors: Sridhar Subramaniam, Sunnyvale, CA (US); Dong Cai, San Jose, CA (US)

(73) Assignee: Exablox Corporation, Sunnyvale, CA (US)

( * ) Notice: Subject to any disclaimer, the term of this patent is extended or adjusted under 35 U.S.C. 154(b) by 19 days.

(21) Appl. No.: 15/146,767

(22) Filed: May 4, 2016

(65) Prior Publication Data

US 2017/0322748 A1    Nov. 9, 2017

(51) Int. Cl.
*G06F 3/06* (2006.01)

(52) U.S. Cl.
CPC ......... *G06F 3/0643* (2013.01); *G06F 3/0604* (2013.01); *G06F 3/0673* (2013.01)

(58) Field of Classification Search
CPC ..... G06F 3/0655; G06F 3/0619; G06F 3/0688
USPC ....................................................... 711/103
See application file for complete search history.

(56) References Cited

U.S. PATENT DOCUMENTS

| 4,656,604 | A | 4/1987 | van Loon |
| 4,660,130 | A | 4/1987 | Bartley et al. |
| 5,420,999 | A | 5/1995 | Mundy |
| 5,561,778 | A | 10/1996 | Fecteau et al. |
| 6,098,079 | A | 8/2000 | Howard |
| 6,154,747 | A | 11/2000 | Hunt |
| 6,167,437 | A | 12/2000 | Stevens et al. |
| 6,314,435 | B1 | 11/2001 | Wollrath et al. |
| 6,356,916 | B1 | 3/2002 | Yamatari et al. |
| 6,480,950 | B1 | 11/2002 | Lyubashevskiy et al. |
| 6,772,162 | B2 | 8/2004 | Waldo et al. |
| 7,043,494 | B1 | 5/2006 | Joshi et al. |
| 7,177,980 | B2 | 2/2007 | Milillo et al. |

(Continued)

FOREIGN PATENT DOCUMENTS

| EP | 1285354 A2 | 3/2004 |
| EP | 2575379 A1 | 4/2013 |

(Continued)

OTHER PUBLICATIONS

International Search Report dated Aug. 6, 2013 5901PCT Application No. PCT/US2013/035675, pp. 1-14.

(Continued)

*Primary Examiner* — Pierre-Michel Bataille
(74) *Attorney, Agent, or Firm* — Carr & Ferrell LLP

(57) ABSTRACT

Organization and management of key-value stores is described. An example method includes providing a stack of tables. Each of the tables includes a set of pages of a pre-determined size for storing a set of key-value entries. The method includes monotonically decreasing a number of pages in the tables according to a position of the table in the stack. The method includes configuring each of the pages in the tables to address a particular range of a key space in such a way that each of the pages in a subsequent table in the stack is configured to address a range addressed by at least two pages in a preceding table in the stack. An action with a key-value entry is carried out by starting with a table in the top of the stack and moving to the next table if the action cannot be carried out.

20 Claims, 9 Drawing Sheets

(56) References Cited

U.S. PATENT DOCUMENTS

| | | | |
|---|---|---|---|
| 7,197,622 B2 | 3/2007 | Torkelsson et al. | |
| 7,266,555 B1 | 9/2007 | Coates et al. | |
| 7,293,140 B2 | 11/2007 | Kano | |
| 7,392,421 B1 | 6/2008 | Bloomstein et al. | |
| 7,403,961 B1 | 7/2008 | Deepak et al. | |
| 7,454,592 B1 | 11/2008 | Shah et al. | |
| 7,509,360 B2 | 3/2009 | Wollrath et al. | |
| 7,539,836 B1 | 5/2009 | Klinkner | |
| 7,685,109 B1 | 3/2010 | Ransil et al. | |
| 7,725,437 B2 | 5/2010 | Kirshenbaum et al. | |
| 7,827,218 B1 | 11/2010 | Mittal | |
| 7,990,979 B2 | 8/2011 | Lu et al. | |
| 8,019,882 B2 | 9/2011 | Rao et al. | |
| 8,099,605 B1 | 1/2012 | Billsrom et al. | |
| 8,132,168 B2 | 3/2012 | Wires et al. | |
| 8,239,584 B1 | 8/2012 | Rabe et al. | |
| 8,364,887 B2 | 1/2013 | Wong et al. | |
| 8,407,438 B1 | 3/2013 | Ranade | |
| 8,447,733 B2 | 5/2013 | Sudhakar | |
| 8,572,290 B1 | 10/2013 | Mukhopadhyay et al. | |
| 8,589,640 B2 * | 11/2013 | Colgrove | G06F 17/30159 707/692 |
| 8,868,926 B2 | 10/2014 | Hunt et al. | |
| 9,009,202 B2 | 4/2015 | Patterson | |
| 9,043,567 B1 | 5/2015 | Modukuri et al. | |
| 9,405,702 B2 * | 8/2016 | Mukherjee | G06F 12/1027 |
| 2002/0069340 A1 | 6/2002 | Tindal et al. | |
| 2002/0087590 A1 | 7/2002 | Bacon et al. | |
| 2003/0028514 A1 | 2/2003 | Lord et al. | |
| 2003/0028585 A1 | 2/2003 | Yeager et al. | |
| 2003/0056139 A1 | 3/2003 | Murray et al. | |
| 2003/0072259 A1 | 4/2003 | Mor | |
| 2003/0101173 A1 | 5/2003 | Lanzatella et al. | |
| 2003/0115408 A1 | 6/2003 | Milillo et al. | |
| 2004/0093361 A1 | 5/2004 | Therrien et al. | |
| 2004/0158588 A1 | 8/2004 | Pruet | |
| 2004/0167898 A1 | 8/2004 | Margolus et al. | |
| 2005/0071335 A1 | 3/2005 | Kadatch | |
| 2005/0080928 A1 | 4/2005 | Beverly et al. | |
| 2005/0081041 A1 | 4/2005 | Hwang | |
| 2005/0160170 A1 | 7/2005 | Schreter | |
| 2005/0256972 A1 | 11/2005 | Cochran et al. | |
| 2006/0039371 A1 | 2/2006 | Castro et al. | |
| 2006/0083247 A1 | 4/2006 | Mehta | |
| 2006/0156396 A1 | 7/2006 | Hochfield et al. | |
| 2006/0271540 A1 | 11/2006 | Williams | |
| 2007/0005746 A1 | 1/2007 | Roe et al. | |
| 2007/0130232 A1 | 6/2007 | Therrien et al. | |
| 2007/0203960 A1 | 8/2007 | Guo | |
| 2007/0230368 A1 | 10/2007 | Shi et al. | |
| 2007/0233828 A1 | 10/2007 | Gilbert | |
| 2007/0271303 A1 | 11/2007 | Menendez et al. | |
| 2007/0276838 A1 | 11/2007 | Abushanab et al. | |
| 2007/0276843 A1 | 11/2007 | Lillibridge et al. | |
| 2008/0005624 A1 | 1/2008 | Kakivaya et al. | |
| 2008/0016507 A1 | 1/2008 | Thomas et al. | |
| 2008/0126434 A1 | 5/2008 | Uysal et al. | |
| 2008/0133893 A1 | 6/2008 | Glew | |
| 2008/0147872 A1 | 6/2008 | Regnier | |
| 2008/0170550 A1 | 7/2008 | Liu et al. | |
| 2008/0183973 A1 | 7/2008 | Aguilera et al. | |
| 2008/0243879 A1 | 10/2008 | Gokhale et al. | |
| 2008/0243938 A1 | 10/2008 | Kottomtharayil et al. | |
| 2008/0244199 A1 | 10/2008 | Nakamura et al. | |
| 2008/0292281 A1 | 11/2008 | Pecqueur et al. | |
| 2009/0019253 A1 * | 1/2009 | Stecher | G06F 12/04 711/207 |
| 2009/0049240 A1 | 2/2009 | Oe et al. | |
| 2009/0100212 A1 | 4/2009 | Boyd et al. | |
| 2009/0172139 A1 | 7/2009 | Wong et al. | |
| 2009/0198927 A1 | 8/2009 | Bondurant et al. | |
| 2009/0199041 A1 | 8/2009 | Fukui et al. | |
| 2009/0307292 A1 | 12/2009 | Li et al. | |
| 2009/0327312 A1 | 12/2009 | Kakivaya et al. | |
| 2010/0023941 A1 | 1/2010 | Iwamatsu et al. | |
| 2010/0031000 A1 | 2/2010 | Flynn et al. | |
| 2010/0036862 A1 | 2/2010 | Das et al. | |
| 2010/0114336 A1 | 5/2010 | Konieczny et al. | |
| 2010/0114905 A1 | 5/2010 | Slavik et al. | |
| 2010/0122330 A1 | 5/2010 | McMillan et al. | |
| 2010/0161817 A1 | 6/2010 | Xiao et al. | |
| 2010/0172180 A1 | 7/2010 | Paley et al. | |
| 2010/0191783 A1 | 7/2010 | Mason et al. | |
| 2010/0217953 A1 | 8/2010 | Beaman et al. | |
| 2010/0228798 A1 | 9/2010 | Kodama et al. | |
| 2010/0262797 A1 | 10/2010 | Rosikiewicz et al. | |
| 2010/0318645 A1 | 12/2010 | Hoole et al. | |
| 2010/0332456 A1 | 12/2010 | Prahlad et al. | |
| 2011/0026439 A1 | 2/2011 | Rollins | |
| 2011/0029711 A1 | 2/2011 | Dhuse et al. | |
| 2011/0034176 A1 | 2/2011 | Lord et al. | |
| 2011/0060918 A1 | 3/2011 | Troncoso Pastoriza et al. | |
| 2011/0106795 A1 | 5/2011 | Maim | |
| 2011/0138123 A1 | 6/2011 | Gurajada et al. | |
| 2011/0213754 A1 | 9/2011 | Bindal et al. | |
| 2011/0231374 A1 | 9/2011 | Jain et al. | |
| 2011/0231524 A1 | 9/2011 | Lin et al. | |
| 2011/0264712 A1 | 10/2011 | Ylonen | |
| 2011/0264989 A1 | 10/2011 | Resch et al. | |
| 2011/0271007 A1 | 11/2011 | Wang et al. | |
| 2012/0011337 A1 | 1/2012 | Aizman | |
| 2012/0030260 A1 | 2/2012 | Lu et al. | |
| 2012/0030408 A1 | 2/2012 | Flynn et al. | |
| 2012/0047181 A1 | 2/2012 | Baudel | |
| 2012/0060072 A1 | 3/2012 | Simitci et al. | |
| 2012/0078915 A1 | 3/2012 | Darcy | |
| 2012/0096217 A1 | 4/2012 | Son et al. | |
| 2012/0147937 A1 | 6/2012 | Goss et al. | |
| 2012/0173790 A1 | 7/2012 | Hetzler et al. | |
| 2012/0179808 A1 | 7/2012 | Bergkvist et al. | |
| 2012/0179820 A1 | 7/2012 | Ringdahl et al. | |
| 2012/0185555 A1 | 7/2012 | Regni et al. | |
| 2012/0210095 A1 | 8/2012 | Nellans et al. | |
| 2012/0233251 A1 | 9/2012 | Holt et al. | |
| 2012/0278511 A1 | 11/2012 | Alatorre et al. | |
| 2012/0290535 A1 | 11/2012 | Patel et al. | |
| 2012/0290629 A1 | 11/2012 | Beaverson et al. | |
| 2012/0310892 A1 | 12/2012 | Dam et al. | |
| 2012/0323850 A1 | 12/2012 | Hildebrand et al. | |
| 2012/0331528 A1 | 12/2012 | Fu et al. | |
| 2013/0013571 A1 | 1/2013 | Sorenson et al. | |
| 2013/0041931 A1 | 2/2013 | Brand | |
| 2013/0054924 A1 | 2/2013 | Dudgeon et al. | |
| 2013/0067270 A1 | 3/2013 | Lee et al. | |
| 2013/0073821 A1 | 3/2013 | Flynn et al. | |
| 2013/0086004 A1 | 4/2013 | Chao et al. | |
| 2013/0091180 A1 | 4/2013 | Vicat-Blanc-Primet et al. | |
| 2013/0162160 A1 | 6/2013 | Ganton et al. | |
| 2013/0166818 A1 | 6/2013 | Sela | |
| 2013/0185508 A1 | 7/2013 | Talagala et al. | |
| 2013/0232313 A1 | 9/2013 | Patel et al. | |
| 2013/0235192 A1 | 9/2013 | Quinn et al. | |
| 2013/0246589 A1 | 9/2013 | Klemba et al. | |
| 2013/0262638 A1 | 10/2013 | Kumarasamy et al. | |
| 2013/0263151 A1 | 10/2013 | Li et al. | |
| 2013/0268644 A1 | 10/2013 | Hardin et al. | |
| 2013/0268770 A1 | 10/2013 | Hunt et al. | |
| 2013/0282798 A1 | 10/2013 | McCarthy et al. | |
| 2013/0288668 A1 | 10/2013 | Pragada et al. | |
| 2013/0311574 A1 | 11/2013 | Lal | |
| 2013/0346591 A1 | 12/2013 | Carroll et al. | |
| 2013/0346839 A1 | 12/2013 | Dinha | |
| 2014/0006580 A1 | 1/2014 | Raghu | |
| 2014/0007178 A1 | 1/2014 | Gillum et al. | |
| 2014/0059405 A1 | 2/2014 | Syu et al. | |
| 2014/0143206 A1 | 5/2014 | Pittelko | |
| 2014/0149826 A1 * | 5/2014 | Lu | G06F 11/108 714/764 |
| 2014/0297604 A1 | 10/2014 | Brand | |
| 2014/0310307 A1 * | 10/2014 | Levy | H04L 45/7453 707/769 |
| 2014/0317065 A1 | 10/2014 | Barrus | |
| 2014/0335480 A1 | 11/2014 | Asenjo et al. | |
| 2014/0351419 A1 | 11/2014 | Hunt et al. | |

(56) References Cited

U.S. PATENT DOCUMENTS

| | | |
|---|---|---|
| 2014/0372490 A1 | 12/2014 | Barrus et al. |
| 2014/0379671 A1 | 12/2014 | Barrus et al. |
| 2015/0012763 A1 | 1/2015 | Cohen et al. |
| 2015/0019491 A1 | 1/2015 | Hunt et al. |
| 2015/0066524 A1 | 3/2015 | Fairbrothers et al. |
| 2015/0081964 A1 | 3/2015 | Kihara et al. |
| 2015/0106335 A1 | 4/2015 | Hunt et al. |
| 2015/0106579 A1 | 4/2015 | Barrus |
| 2015/0172114 A1 | 6/2015 | Tarlano et al. |
| 2015/0220578 A1 | 8/2015 | Hunt et al. |
| 2015/0222616 A1 | 8/2015 | Tarlano et al. |

FOREIGN PATENT DOCUMENTS

| | | |
|---|---|---|
| EP | 2834749 A1 | 2/2015 |
| EP | 2834943 A1 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 A2 | 5/2016 |
| EP | 3020259 A1 | 5/2016 |
| JP | 2004252663 A | 9/2004 |
| JP | 2008533570 A | 8/2008 |
| JP | 2010146067 A | 7/2010 |
| JP | 2011095976 A | 5/2011 |
| JP | 2012048424 A | 3/2012 |
| WO | W02013152357 A1 | 10/2013 |
| WO | WO2013152358 A1 | 10/2013 |
| WO | WO2014176264 A1 | 10/2014 |
| WO | WO2014190093 A1 | 11/2014 |
| WO | WO2014201270 A1 | 12/2014 |
| WO | WO2014205286 A1 | 12/2014 |
| WO | WO2015006371 A2 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Huck et al. Architectural Support for Translation Table Management in Large Address Space Machines. ISCA '93 Proceedings of the 20th Annual International Symposium on Computer Architecture, vol. 21, No. 2. May 1993. pp. 39-50.

International Search Report dated Aug. 2, 2013 5847PCT Application No. PCT/US2013/035673, pp. 1-7.
International Search Report dated Sep. 10, 2014 6362PCT Application No. PCT/US2014/035008, pp. 1-13.
Askitis, Nikolas et al., "HAT-trie: A Cache-conscious Trie-based Data Structure for Strings", pp. 1-9.
International Search Report dated Sep. 24, 2014 6342PCT Application No. PCT/US2014/039036, pp. 1-13.
International Search Report dated Oct. 22, 2014 6360PCT Application No. PCT/US2014/043283, pp. 1-12.
International Search Report dated Nov. 7, 2014 6361PCT Application No. PCT/US2014/042155 pp. 1-13.
International Search Report dated Jan. 21, 2015 6359PCT Application No. PCT/US2014/060176, pp. 1-10.
International Search Report dated Feb. 24, 2015 6359PCT Application No. PCT/US2014/060280, pp. 1-14.
International Search Report dated Mar. 4, 2015 6337PCT Application No. PCT/US2014/067110, pp. 1-14.
International Search Report dated Apr. 2, 2015 6340PCT Application No. PCT/US2014/045822, pp. 1-13.
International Sesarch Report dated May 14, 2015 6450PCT Application No. PCT/US2015/013611, pp. 1-17.
International Sesarch Report dated May 15, 2015 6341PCT Application No. PCT/US2015/014492, pp. 1-18.
Invitation pursuant to Rule 63(1) dated May 19, 2015 5847EP Application No. 13772293.0, pp. 1-4.
Extended European Search Report dated Aug. 4, 2015 5901EP Application No. 13771965.4, pp. 1-6.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1 , 2001. pp. 149-160.
Extended European Search Report dated Aug. 20, 2015 5847EP Application No. 13772293.0, pp. 1-9.
Office Action dated Mar. 15, 2016 in Japanese Patent Application No. 2015-504769 filed Apr. 8, 2013 pp. 1-39.
Joao, Jose et al., "Flexible Reference-Counting-Based Hardware Acceleration for Garbage Collection," Jun. 2009, ISCA '09: Proceedings of the 36th annual internaltional symposium on Computer Architecture, pp. 418-428.
Office Action dated Mar. 29, 2016 in Japanese Patent Application No. 2015-504768 filed Apr. 8, 2013, pp. 1-16.
Notice of Allowance dated Jul. 26, 2016 for Japanese Patent Application No. 2015-504768 filed Apr. 8, 2013, pp. 1-4.

* cited by examiner

ORGANIZATION AND MANAGEMENT OF KEY-VALUE STORES

TECHNICAL FIELD

This disclosure relates generally to data processing and, more specifically, to methods and systems for organization and management of key-value stores.

BACKGROUND

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Key-value stores are widely used in systems for organizing data. Typically, a key-value store represents a set of entries, wherein each entry includes a key from a certain key space and a value associated with the key. The keys are used for fast finding a key-value entry in the key-value store in order to retrieve values, modify the values, and delete the values form the key-value store.

Key-value stores are used to provide fast lookup and addition of key-value entries for numerous applications. Key-values stores may be implemented using various storage devices, such as, but not limited to, flash memory, solid-state drives, hard disk drives, optical devices, and so forth.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure are directed to computer-implemented methods for organization and management of a key-value store for accessing a memory. According to an example embodiment, a method includes providing a stack of tables (also referred to as persisted tables). Each of the tables includes a set of pages of a pre-determined size. Each of the pages is configured to store a set of key-value entries. Each of the key-value entries includes a key and a value. The method further includes monotonically decreasing a number of pages in the tables according to a position of the table in the stack. The method also includes configuring each of the pages in the tables to address a particular range of a key space in such a way that each of the pages in a subsequent table in the stack is configured to address a key space range addressed by at least two pages in a preceding table in the stack.

In some embodiments, the key space has a uniform distribution. In some embodiments, the number of pages in the subsequent table in the stack is a fraction of the number of pages in the previous table of the stack. In some embodiments, the method further includes receiving a request for an action with a particular key-value entry. The method then performs operations, from the top of the stack, for a particular table in the stack. The operations include determining, based on a key associated with the particular key-value entry, a particular page in the particular table. The particular page addresses a particular range in the key space. The particular range includes a key associated with the particular key-value entry. The operations further include determining whether the action can be carried out using the particular page. If the action can be carried out, the action is performed using the particular page. If the action cannot be carried out, the operations include shifting to a table subsequent the particular table in the stack to repeat the operations.

In some embodiments, determining the particular page in the particular table includes using a per table based Bloom filter for the particular key-value entry.

In some embodiments, if the action includes an addition of the particular key-value entry, then determining that the action can be carried out includes determining that the particular page includes room for the addition.

In some embodiments, if the action includes at least one reading, modifying, and deleting of the particular key-value entry, then determining that the action can be carried out includes determining that the particular page holds the particular key-value entry. In certain embodiments, the determining that the particular page holds the particular key-value entry includes using a per page based Bloom filter for the particular key-value entry.

In some embodiments, the method may include providing a RAM table for storing recently used key-value entries. The RAM table includes cache pages. Each of the RAM pages is configured to address a RAM range of the key space in such a way that the RAM range is addressed by at least two pages from a first table in the stack. The method includes placing the RAM table at the top of the stack of the persisted tables. The recently used key-value entries from the RAM table can be periodically used to amortize reading, modify, and delete the key-value entries in the persisted tables in the stack. All actions with key-value entries, including adding, deleting, modifying, and reading the key-value entries, are performed starting with the RAM table. If a particular key-value entry is not found in the RAM table, an attempt of finding the particular entry is performed starting with the first persisted table in the stack.

In some embodiments, the RAM table is located in a random-access memory (RAM) and each of the persisted tables in the stack is located on at least one of solid-state disk, flash memory, or hard-disk drive. According to another example embodiment of the present disclosure, the steps of the method for organizing and managing a key-value store are stored on a machine-readable medium comprising instructions, which, when implemented by one or more processors, perform the recited steps.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1A:
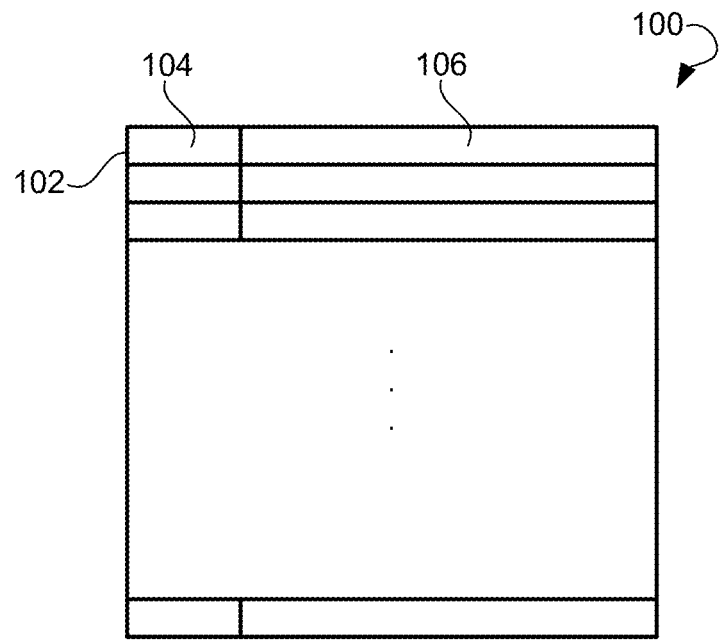
FIG. 1A is a block diagram illustrating an example page containing key-value entities.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

Various embodiments of the present technology provide a key-value store for storing hundreds of millions of equal-sized entries distributed over a probabilistically uniform key space. Some embodiments of the present technology can be used to provide a key-to-location index for objects. Some other embodiments can be used for other key-value mappings as well. Some embodiments of the present technology are designed for a solid-state storage. Certain embodiments can be used across tiers of storage.

Embodiments of the present disclosure are intended to enhance several characteristics of key-value stores, such as parallelism, input/output efficiency, pre-allocated space, and data integrity. A key-value store with a key space that has a probabilistically uniform distribution is highly parallel. If the key-value store acquires "interior" structures, then the interior structures may turn into potential bottlenecks.

For example, solid-state drives (SSD) have significant internal parallelism, because of which their performance scales significantly with queue depth, so the ability to have multiple outstanding read and write requests at the storage device becomes a key requirement.

To maintain data-path IO efficiency, storage device number of read and write operation requirements are as follows:
 close to 1 device reads and 0 device writes for every lookup of an existing key that has not been recently accessed (cold);
 close to 0 device reads and 0 device writes for every lookup of a non-existent key;
 close to 0 device reads and significantly less than 1 device writes (under a write-heavy load) for every key addition;
 1 device read and less than 1 device write (under a write-heavy load) for every key modification.

Requirements for background activity are:
 background IO to stored entries is minimal and ideally coupled with taking advantage of a storage device's tiers;
 background tasks should not lock out large portions of the key-value store.

Key-value stores that allocate and free space dynamically come with inherent complexity and use allocation structures that have to be kept synchronized. While these structures are useful as general purpose software, they do not necessarily present the best trade-offs in the more defined world of appliance software.

A key-value store is required to not corrupt existing entries at any point (with or without a crash). A key-value store is required to remain a valid key-value store after a crash and restart.

According to an example embodiment of the present disclosure, the method includes providing a stack of tables. Each of the tables includes a set of pages of a pre-determined size. Each of the pages is configured to store a set of key-value entries. Each of the key-value entries includes a key and a value. The method includes enforcing a number of pages in the tables to monotonically decrease with a position of the table in the stack. The method configures each of the pages in the tables to address a particular range of a key space in such a way that each of the pages in a subsequent table in the stack is configured to address a key space range addressed by at least two pages in a preceding table in the stack.

FIG. 1A illustrates an example page 100. The example page 100 includes key-value entries 102. A key-value entry includes a key 104 and a payload 106 (also referred as a value). Every permutation of bits in the key has the same probability. For example, if a key-value entry is 84 bytes, wherein the key is 20 bytes and the payload is 64 bytes, than a little over 90 key-value entries can be fitted in one page of 8 kilobytes.

Figure 1B:
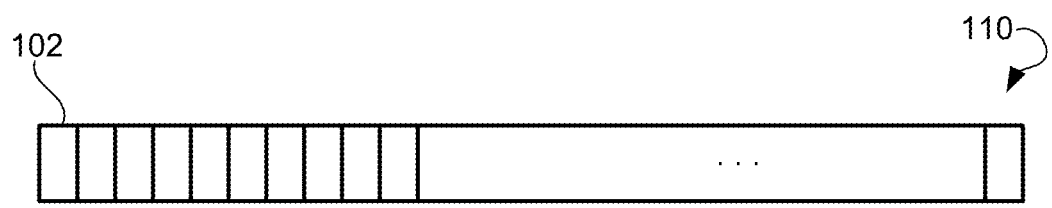
FIG. 1B is a block diagram illustrating an example table containing pages of key-value entries.

FIG. 1B shows an example table 110 of key-value entries in a dedicated partition of a memory storage (for example, in a SSD). The table 110 can be divided into page-sized buckets (pages). Each page can hold a certain number of key-value entries. For example, if the partition is 16 Gigabytes in size and a page is 8 Kilobytes in size, then the table 110 includes over 2 million pages.

An example method for inserting an entry into table 110 may include the following operations: translating a key to a page number in the table 110, reading the page, modifying the page to add/modify the entry, and writing the page back to the table. The method of using just one table has some clear drawbacks since an equal probability of distribution of keys in the key space implies a normal distribution of "fullness" of page buckets.

Figure 2:
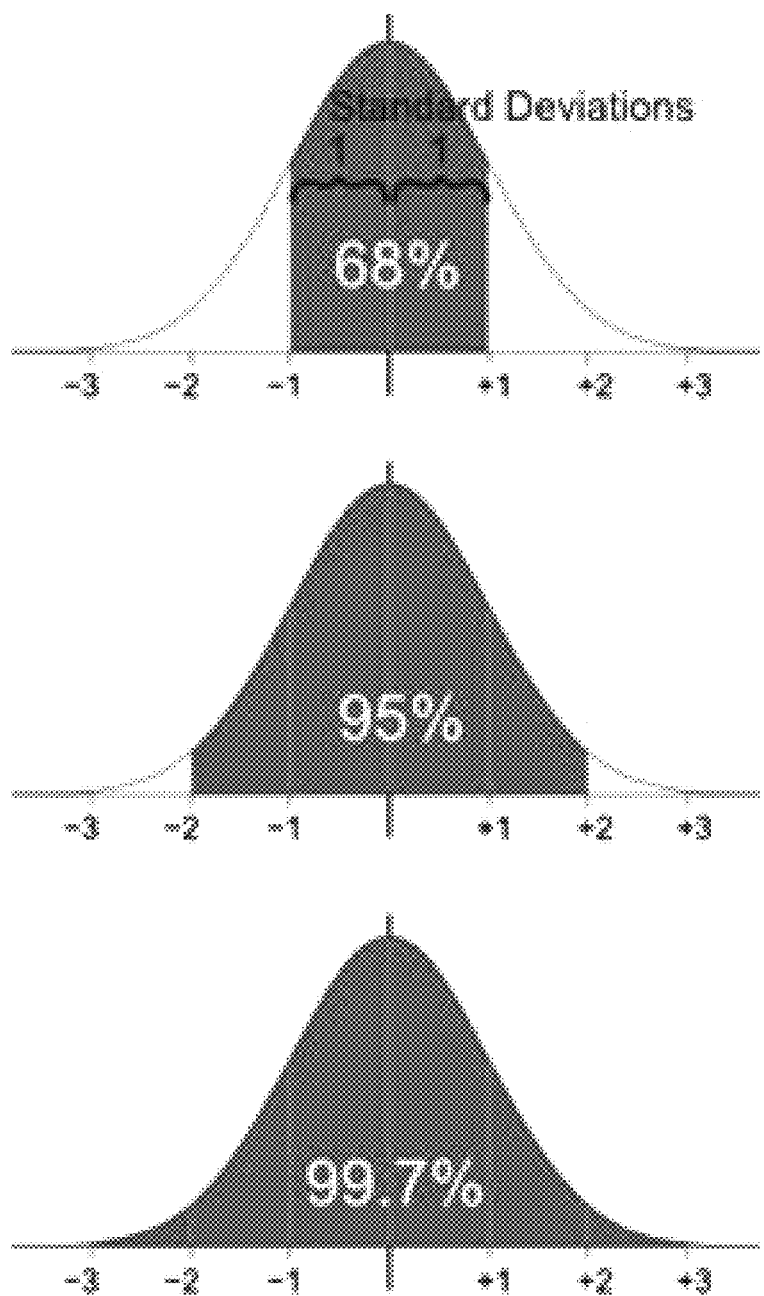
FIG. 2 illustrates probabilities of filling up equal-sized pages containing key-value entries with random keys.

Some of the pages in table 110 are filled up with key-value entries faster than the rest of the pages. More specifically, when keys of the key-value entries are randomly selected, the pages in table 110 are filled up according to normal distribution. Thus, 68% of the pages can become full within one standard deviation (SD) of the average, 95% within two SD and 99.7% within three SD, as shown in the illustrated probabilities 200 of FIG. 2. Therefore, when just one table 110 is used to keep key-value entries, the table is likely to be declared to be full before it is actually full.

To provide for the variance, a stack of tables arranged in tiers can be used. A table in a lower tier captures spillover from a table in a higher tier. The table in the lower tier is divided into fewer number of pages than the table in the higher tier.

Figure 3:
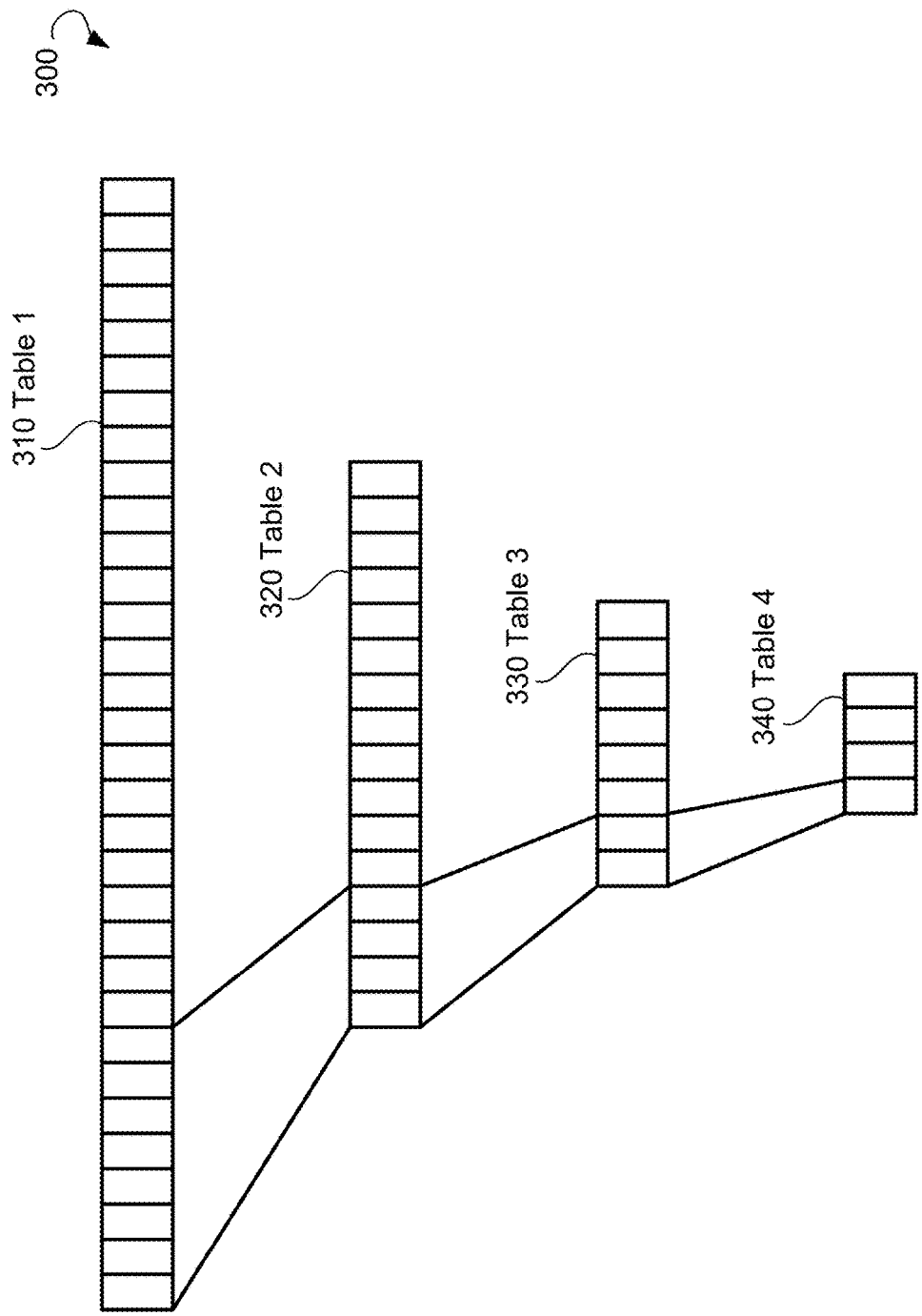
FIG. 3 is a block diagram illustrating a stack of tables for holding pages of key-value entries.

FIG. 3 illustrates an example stack 300 of tables of key-value entries. In the example of FIG. 3, stack 300 of tables includes a table 310 (Table 1), a table 320 (Table 2), a table 330 (Table 3), and a table 340 (Table 4) arranged in four tiers. Each page in Table 2 addresses a range of the key space twice as wide as each page in Table 1. This way, one page in Table 2 can be used to hold key-value entries spilled over from two pages of Table 1. Similarly, each page in Table 3 addresses a range of the key space twice as wide as each page in Table 2 (and hence four times as wide as each page in Table 1), and so on.

In some embodiments, the actual sizing of tables in stack 300 is subject to the standard deviation of key distribution. In other words, the size of the lower tables is selected to fit the bell curve of normal distribution for a given key type (for example, SHA-1 sum). If Table 1 fits average+1 SD, Table 2 fits 1 SD, and Table 3 fits 1 SD, then all tables have the capacity to fit almost all entries. Table 4 can be used to catch all "tail" logs for the very small percentage of key-value entries that spill previous Table 3.

In some embodiments of the present disclosure, additions, deletions, and lookups of key-value entries start from the highest table and percolate down only as needed.

For example, in the case of an addition of a key-value entry, the addition is first attempted with Table 1. If all pages in Table 1 are full, then some of the key-value entries in Table 1 are moved to Table 2, and so forth. In some embodiments, distribution of key-value entries between the tables can be chosen in such a way that cold key-value entries are moved from a higher table to lower tables. In some embodiments, the Tables 1, 2, and 3 can be allocated in a tiered storage. For example, the Tables 1, 2, and 3 can be stored across fast flash memory, commodity SSD, and hard-disk devices (HDD).

In the case of a deletion of a key-value entry with a given key, a "tombstone" entry is added to the highest table if a lower table has the key-value entry that is required to be deleted. The "tombstone" entry can be removed when none of the tables have a key-value entry with the key. In some embodiments, a Bloom filter can be used to predict which of the tables have a key-value entry with the given key.

In the case of a lookup of a key-value entry, the search is started from Table 1 and descends down to Tables 2, 3, and 4 if needed.

In some embodiments, iterating through key-value entries includes copying a vertical slice of pages into a RAM. In some embodiments, the vertical slice (a snapshot) includes 32 pages from Table 1, 16 pages from Table 2, 8 pages from Table 3, and 4 pages from Table 4 in a separate structure. After the copying, iterating through the key-value entries is carried out in the vertical slice.

In some embodiments, a lock domain for all operations is at least as wide as the number of pages in the lowest table. Fewer, coarser lock domains can be configured to minimize the total number of locks. For example, with 2 million pages in Table 1 and 256 thousand pages in Table 4, the number of lock domain can be 4,096.

In some embodiments, Bloom filters for tables are used to avoid negative lookups for key-value entries for write, create, and modify operations. However, using a table-wide Bloom filter can incur a significant filter rebuild penalty as key-value entries are added and removed.

In some embodiments, a per-page Bloom filter is used for the set of keys contained within a page on SSD to avoid reading "n" pages and to minimize the overhead added by negative lookups. A per-page Bloom filter can be regenerated very quickly by walking through a few dozen keys. In some embodiments, lookups include using the Bloom filter for the page. The page is read only if a Bloom filter pass is positive. For example, using a 64-byte Bloom filter results in a false/positive ratio of 8.5% for a page with 100 key-value entries.

In example of FIG. 3, assuming 64 bytes per page, 128 megabytes in RAM can be used for over 2 million Bloom filters for the example Table 1 with over 2 million pages. If a corresponding Table 2 has 1,048,576 pages, then another 64 Megabytes can be used in RAM for Bloom filters for Table 2. Similarly, if Table 3 includes 262,144 pages, that will require an additional 16 megabytes in RAM for Bloom filters. Overall, the example stack 300 requires 208 Megabytes in RAM for Bloom filters.

Figure 4:
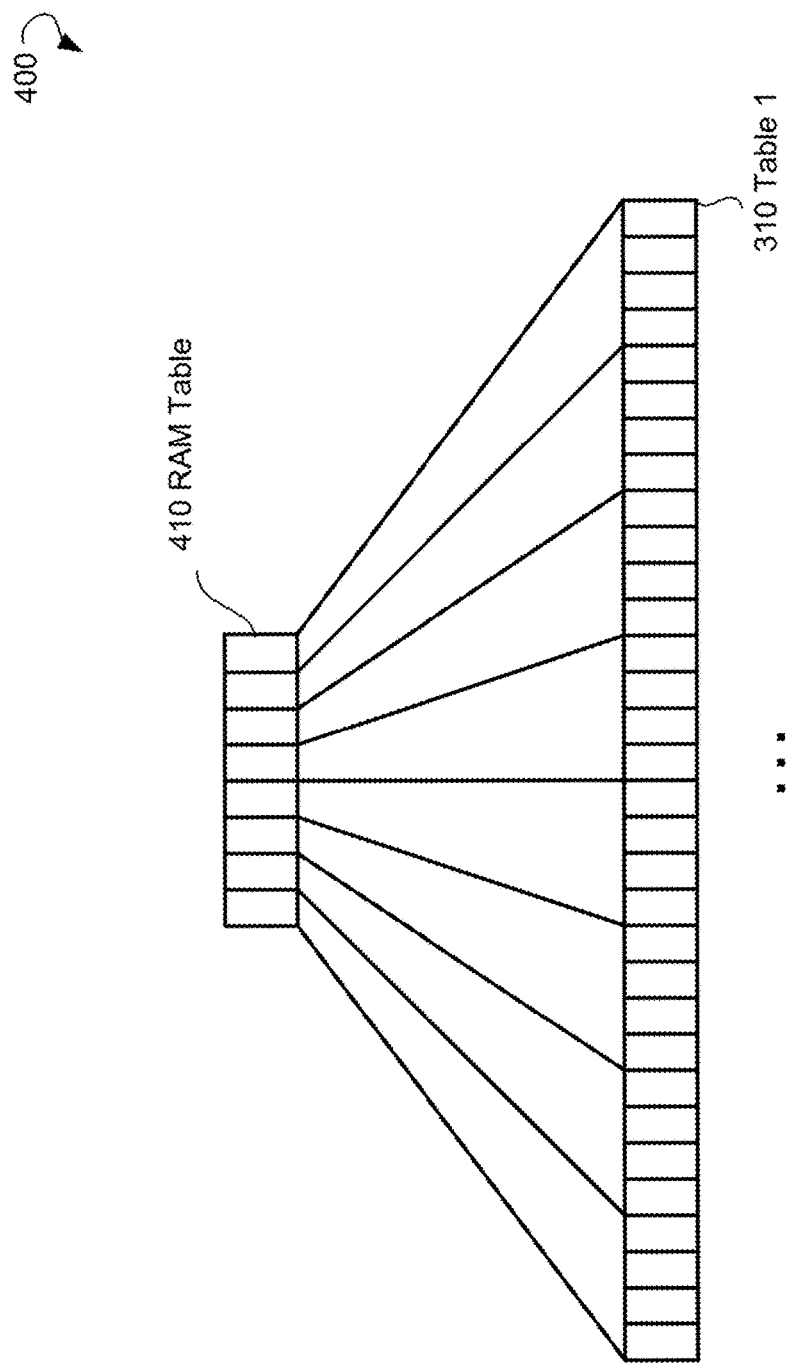
FIG. 4 is a block diagram illustrating a stack of tables including a RAM table.

As shown in an example stack 400 of FIG. 4, some embodiments include a RAM table 410 (also referred herein as a RAM Table). The RAM Table 410 can serve as a write-back cache. For every contiguous region of m pages in Table 1, one page in the RAM Table 410 can be used to hold new or modified key-value entries. In example of FIG. 3, one page in RAM Table 410 corresponds to 4 pages of table 310 (Table 1). In other embodiments, one page in RAM Table 410 can correspond to 32 pages of Table 1. In various embodiments, the RAM Table 410 includes a cache of key-value entries that are likely to be read or modified soon. The key-value entries in the cache can be determined by a policy (for example, a least recently used (LRU) policy). If a read of the entry is not served by the RAM Table 410, then the read is carried out by reading the Tables 1, 2, 3, and so forth as described in FIG. 2. In various embodiments, the RAM table 410 is located in RAM, while the stack Tables 1, 2, 3, and so forth are located in memory storage (for example, in SSD, HDD, Flash, and other).

When being added, a key-value entry is first searched for in the RAM Table 410. If the key-value entry is still in the RAM Table 410 and being modified, the key-value entry is modified in-place in the RAM Table 410. Asynchronously, each page in RAM Table 410 is flushed by reading/modifying/writing the corresponding region of pages in Table 1 (located, for example on SSD). Since an existing region cannot be used on power-fail, a spare physical region is used to write the region of spaces. Once the write completes, the page region that was read in earlier for the flush turns into the spare region. The page regions are shuffled across the Table 1 over time. Therefore, in some embodiments, a region map is built in memory at each stack of tables. The region map is configured to show a map of "logical" region identifiers (IDs) to a physical region offset. In certain embodiments, the region ID can include the bytes of the key used to find a region.

If the Table 1 region is almost full, a set of entries are flushed to the corresponding pages in Table 2. Similarly, when the region in Table 2 is nearly full, a set of entries are flushed to the corresponding pages in Table 3. The cascading of flushes can be carried out infrequently by picking an appropriate batch size for moving entries from one of Table 1, 2, or 3 to the next lower table.

Figure 5:
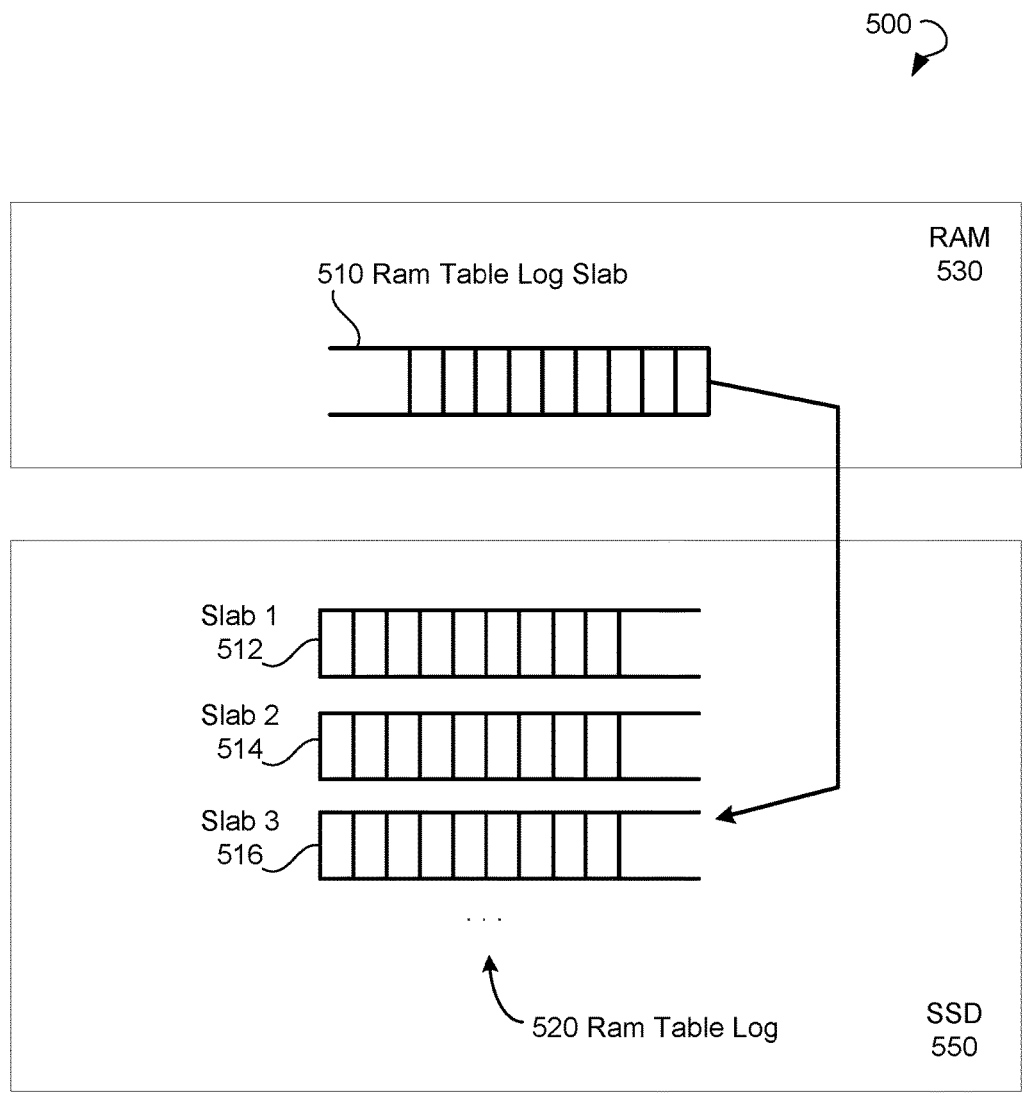
FIG. 5 is a block diagram illustrating a system for logging content of RAM table.

The time between flushes for a given page in the RAM Table 410 is unbounded. Therefore, in some embodiments, incoming entries are added into an in-memory RAM Table Log Slab. FIG. 5 is a block diagram illustrating a system 500 for logging of content of a RAM table. The log system 500 includes a RAM Table Log Slab 510 located in a RAM 530 and a Ram Table Log 520 located in a memory storage such as, for example, SSD 550. The RAM Table Log 520 may include slabs such as, for example, slabs 512, 514, and 516. A current slab is saved to the memory storage (for example SSD) on every "sync" request of the table stack 300. Some embodiments include a bulk entry add interface. The bulk entry add interface takes a batch of entries to be added/modified, writes the batch of entries to the Ram Table, and calls "sync" internally to save the entries to the Ram Table log (not to flush any pages) before responding to the caller.

With 84-byte Entries, the Ram Table Log fills up at the rate of 1 Megabyte for every 12,483 entries. If up to 800

Megabytes of memory storage space (for example SSD) are reserved for the Ram Table Log, the Ram Table Log includes over 10 million Entries. By the time the reserved space fills up, most of the pages whose entries are present in the oldest Ram Table Log Slab are likely to be flushed. For the rest, some pages are forced to be flushed in order to free up the Ram Table Log Slab. However, the pages dirtied at the time of the oldest Ram Table Log Slab 510 are likely to be rather full.

In some embodiments, pages are flushed for two reasons:
1) the page is nearly full; and
2) the page needs to be flushed to free up space in the Ram Table Log.

In some embodiments, a monotonically increasing count can be used to differentiate flushes that occurred before the slab was written from those that occurred later. In some embodiments, on a recovery following a crash, the whole Ram Table Log is placed into the Ram Table, which can result in some flushing to the persisted tables as well.

Figure 6:
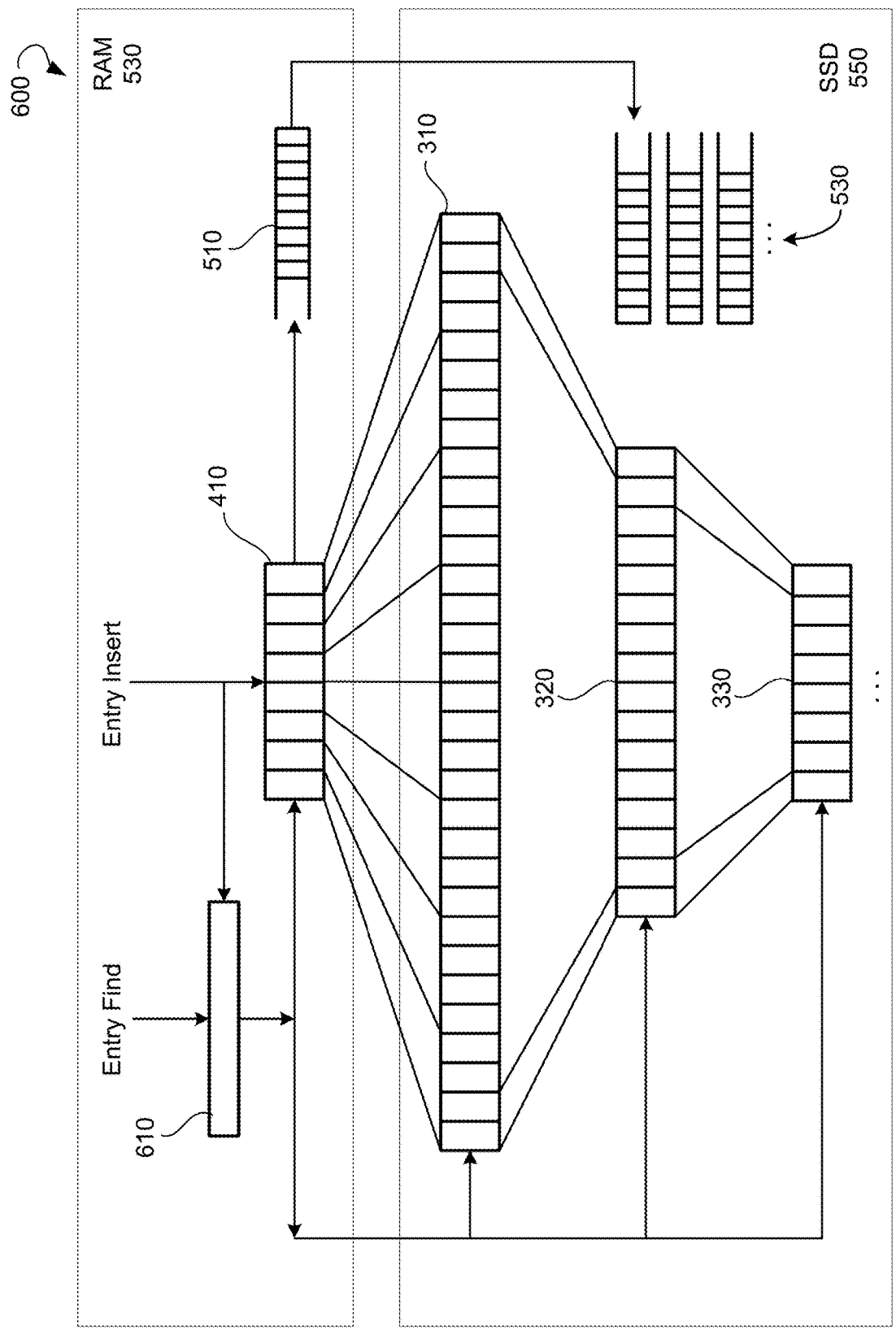
FIG. 6 is a block diagram illustrating a system for organization and management of a key-value store.

FIG. 6 is a block diagram showing a system 600 for organization and management of a key-value entries store, according to an example embodiment. The example system 600 includes a stack of tables including table 310, table 320, and table 330. The stack of tables may include table 340 (shown in FIG. 3). Details of the stack of tables are described in FIG. 3.

The system 600 includes a RAM table 410. Details and functionalities of RAM table 410 are described in FIG. 4. In some embodiments, the RAM table 410 is located in a RAM, while the stack of tables is located in memory storage, such as but not limited to SSD 550, HDD, Flash memory, and so forth.

The system 600 includes Ram Table Log Slab 510 and a Ram Table log 520. Details of Ram Table Log Slab 510 and a Ram Table Log 520 are described in FIG. 5. In some embodiments, Ram Table Log Slab 510 is located in a RAM 530 and Ram Table Log 520 is located in memory storage, such as but not limited to SSD 550, HDD, Flash, and so forth.

Upon receiving a request of insertion of a new key-value entry, system 600 is configured to attempt to insert the new entry to the RAM table 410. If a page of the RAM table to which the key-value entry should belong is full, then the attempt to insert the new key-value entry is repeated iteratively for the tables 310, 320, 330, and so forth.

Upon receiving a request to find a particular page that holds a particular key-value entry 610, the search is first carried out for RAM table 410. If RAM table 410 does not contain the key-value entry 610, then the search for the particular page is continued iteratively for the tables 310, 320, 330, and so forth.

Figure 7:
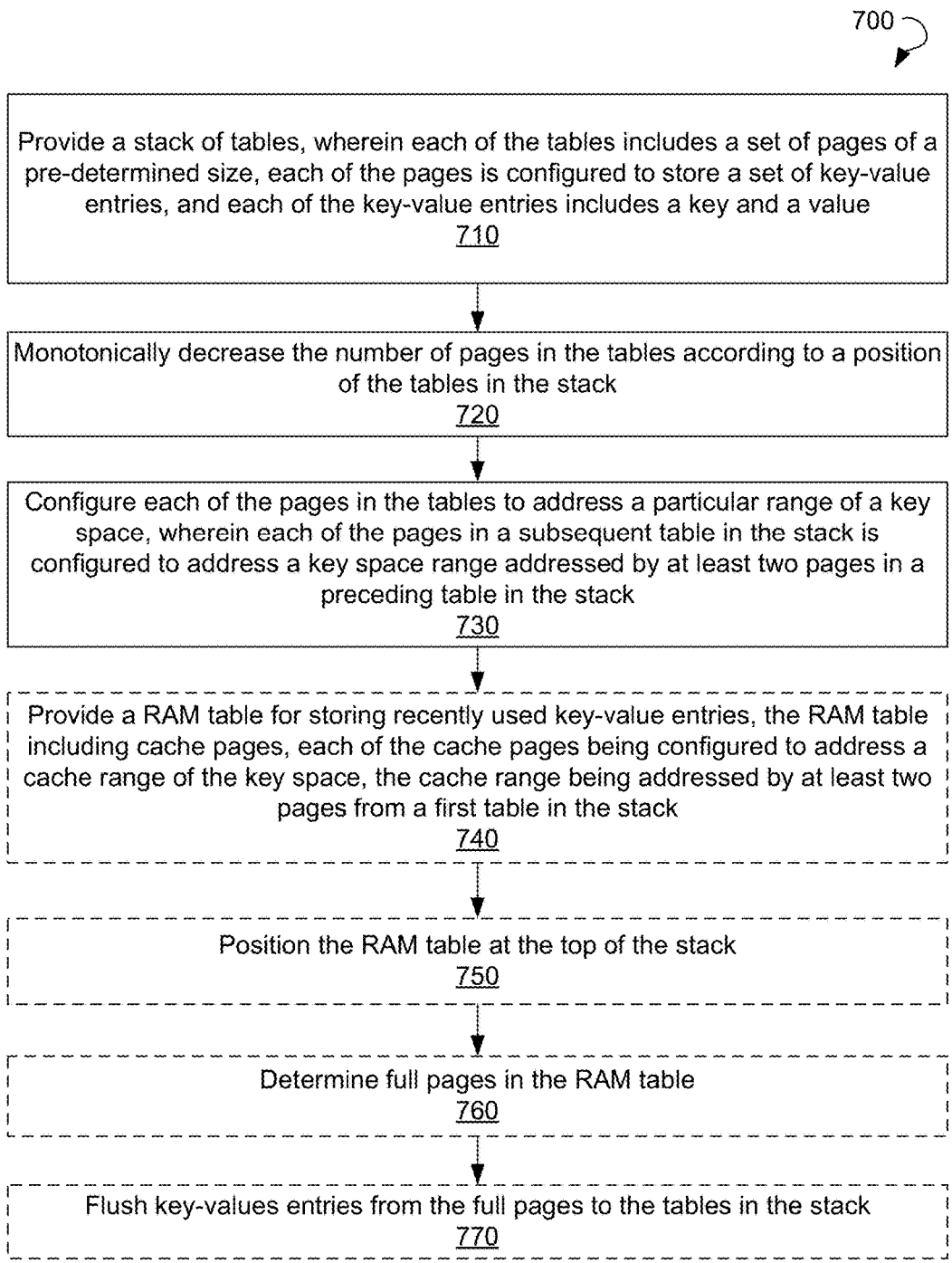
FIG. 7 is a process flow diagram showing a method for organization and management of a key-value store.

FIG. 7 is a process flow diagram showing operations of a method 700 for organization and management of key-value store, according to an example embodiment. The operations of method 700 can be carried out using at least one processor and a memory storage of a computing device. An example computing device is described below in FIG. 9.

The example method 700 may commence, in block 710, with providing a stack of tables. Each of the tables includes a set of pages of a pre-determined size. Each of the pages is configured to store a set of key-value entries. Each of the key-value entries includes a key and a value.

In block 720, the method 700 enforces a number of pages in the tables to monotonically decrease with a position of the table in the stack.

In block 730, the method 700 includes configuring each of the pages in the tables to address a particular range of a key space. The particular range is selected in such a way that each of the pages in a subsequent table in the stack is configured to address a key space range addressed by at least two pages in a preceding table in the stack.

In some embodiments, the method 700 includes optional blocks 740-760. In optional block 740, method 700 may include providing a RAM table for storing recently used key-value entries. The RAM table includes cache pages. Each of the cache pages is configured to address a cache range of the key space. The cache range is addressed by at least two pages from a first table in the stack.

In some embodiments, the RAM table is placed at the top of the stack in block 750. In optional block 760, method 700 includes determining full pages in the RAM table. In optional block 770, method 700 allows flushing key-value entries from the full pages into the tables of the stack.

Figure 8:
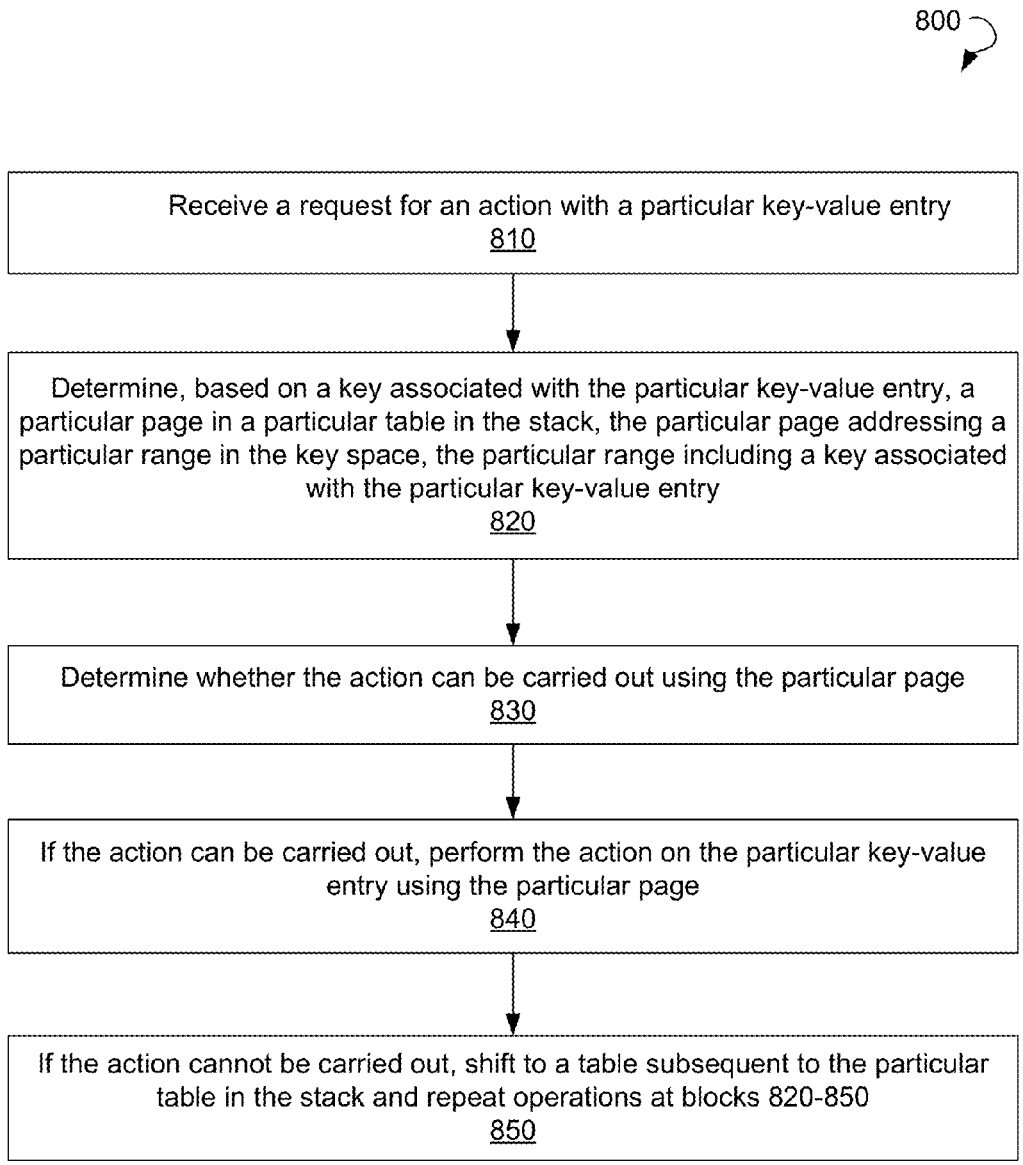
FIG. 8 is a process flow diagram showing a method for performing actions with a key-value store.

FIG. 8 is a process flow diagram showing a method 800 for performing an action on a key-value entry, according to an example embodiment. In some embodiments, the operations of method 800 can be performed after operations of method 700. The operations of method 800 can be carried out using at least one processor and a memory storage of a computing device. An example computing device is described below in FIG. 9.

In block 810, the example method 800 can commence with receiving a request for an action with a particular key-value entry. The action may include adding the particular key-value entry to the key-value store, reading the particular key-value entry from the key-value store, modifying the particular key-value entry in the key-value store, or deleting the particular key-value entry from the key-value store.

In block 820, the method includes determining, based on a key associated with the particular key-value entry, a particular page in a particular table in the stack. The particular page addresses a particular range in the key space, wherein the particular range includes the key associated with the particular key-value entry. In other embodiments, the particular page is determined using a per table based Bloom filter for the particular key-value entry.

In block 830, the method 800 includes determining whether the action can be carried out using the particular page. If the action includes an addition of the particular key-value entry, then determining that the action can be carried out includes determining that the particular page is full. If the action includes one of reading, modifying, or deleting the particular key-value entry, then determining that the action can be carried out includes determining that the particular page holds a key-value entry with the key associated with the particular entry. In some embodiments, determining the particular page includes using a per page Bloom filter for the key associated with the particular key-value entry.

In block 840, if the action can be carried out, the action on the particular key-value entry is performed using the particular page. In block 850, if the action cannot be carried out, the method proceeds with shifting to a table subsequent the particular table in the stack and repeats operations at blocks 820-850 for the subsequent table.

Figure 9:
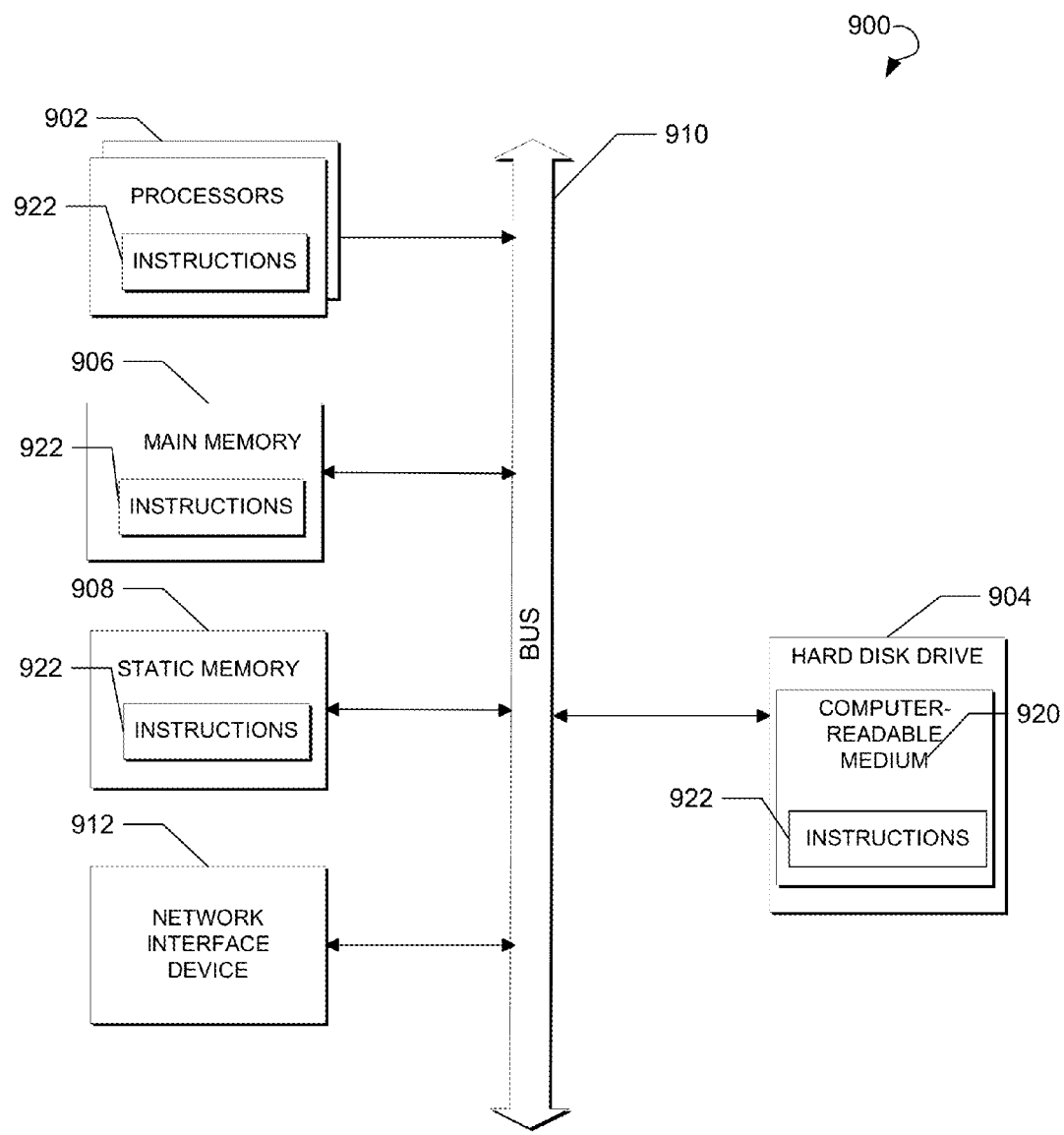
FIG. 9 shows a diagrammatic representation of a computing device for a machine in the example electronic form of a computer system, within which a set of instructions for causing the machine to perform any one or more of the methodologies discussed herein can be executed.

FIG. 9 shows a diagrammatic representation of a computing device for a machine in the exemplary electronic form of a computer system 900, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a PDA, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902, a hard disk drive 904, a main memory 906, and a static memory 908, which communicate with each other via a bus 910. The computer system 900 may also include a network interface device 912. The hard disk drive 904 may include a computer-readable medium 920, which stores one or more sets of instructions 922 embodying or utilized by any one or more of the methodologies or functions described herein. The instructions 922 can also reside, completely or at least partially, within the main memory 906 and/or within the processors 902 during execution thereof by the computer system 900. The main memory 906 and the processors 902 also constitute machine-readable media.

While the computer-readable medium 920 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, and optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, Javascript, Go, or other compilers, assemblers, interpreters or other computer languages or platforms.

Thus, systems and methods for organization and management of a key-value store are disclosed. Although embodiments have been described with reference to specific example embodiments, it may be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for organization and management of a key-value store, the method comprising:
    providing a stack of tables, wherein each table includes a set of pages of a pre-determined size, wherein each of the pages is configured to store a set of key-value entries, and each of the key-value entries includes a key and a value;
    monotonically decreasing a number of pages in the tables according to a position of the table in the stack; and
    configuring each of the pages in the tables to address a particular range of a key space, wherein each of the pages in a subsequent table in the stack is configured to address a key space range addressed by at least two pages in a preceding table in the stack.

2. The method of claim 1, wherein the key space includes a uniform distribution.

3. The method of claim 1, wherein the number of pages in the subsequent table in the stack is a fraction of the number of pages in the previous table in the stack.

4. The method of claim 1, further comprising:
    receiving a request for an action with a particular key-value entry; and
    performing, from a top of the stack, for a particular table in the stack, the following operations:
        determining, based on a key associated with the particular key-value entry, a particular page in the particular table, the particular page addressing a particular range in the key space, the particular range including a key associated with the particular key-value entry;
        determining whether the action can be carried out using the particular page;
        if the action can be carried out, performing the action on the particular key-value entry using the particular page; and
        if the action cannot be carried out, shifting to a table subsequent the particular table in the stack to repeat the operations.

5. The method of claim 4, wherein:
    the action includes an addition of the particular key-value entry; and
    the determining that the action can be carried out includes determining that the particular page includes room for the addition.

6. The method of claim 4, wherein:
    the action includes at least one of reading, modifying, and deleting of the particular key-value entry; and
    the determining that the action can be carried out includes determining that the particular page holds the particular key-value entry.

7. The method of claim 6, wherein the determining that the particular page holds the particular key-value entry includes using a per page based Bloom filter for the particular key-value entry.

8. The method of claim 4, wherein the determining that the particular page is in the particular table includes using a per table based Bloom filter for the particular key-value entry.

9. The method of claim 1, further comprising:
    providing a RAM table for storing recently used key-value entries, the RAM table including cache pages, each of the cache pages being configured to address a cache range of key space, the cache range being addressed by at least two pages from a first table in the stack;
placing the RAM table at a top of the stack;
determining full pages in the RAM table; and
in response to the determination, flushing key-values entries from the full pages to the tables in the stack.

10. The method of claim 9, wherein the RAM table is located in a random-access memory and each of the tables in the stack is located on at least one of a solid-state disk, flash memory, or hard-disk drive.

11. A system for organization and management of a key-value store, the system comprising:
at least one processor; and
a memory communicatively coupled to the at least one processor, the memory storing instructions, which, when executed by the at least one processor, perform a method comprising:
providing a stack of tables, wherein each of the tables includes a set of pages of a pre-determined size, wherein each of the pages is configured to store a set of key-value entries and each of the key-value entries includes a key and a value;
monotonically decreasing a number of pages in the tables according to a position of the table in the stack; and
configuring each of the pages in the tables to address a particular range of a key space, wherein each of the pages in a subsequent table in the stack is configured to address a key space range addressed by at least two pages in a preceding table in the stack.

12. The system of claim 11, wherein the key space has a uniform distribution.

13. The system of claim 11, wherein the number of pages in the subsequent table in the stack is a fraction of the number of pages in the previous table in the stack.

14. The system of claim 11, wherein the method further comprises:
receiving a request for an action with a particular key-value entry; and
performing, from a top of the stack, for a particular table in the stack, the following operations:
determining, based on a key associated with the particular key-value entry, a particular page in the particular table, the particular page addressing a particular range in the key space, the particular range including a key associated with the particular key-value entry;
determining whether the action can be carried out using the particular page;
if the action can be carried out, performing the action on the particular key-value entry using the particular page; and
if the action cannot be carried out, shifting to a table subsequent the particular table in the stack to repeat the operations.

15. The system of claim 14, wherein:
the action includes an addition of the particular key-value entry; and
the determining that the action can be carried out includes determining that the particular page includes room for the addition.

16. The system of claim 14, wherein:
the action includes at least one of reading, modifying, and deleting of the particular key-value entry; and
the determining that the action can be carried out includes determining that the particular page holds the particular key-value entry.

17. The system of claim 16, wherein the determining that the particular page holds the particular key-value entry includes using a per page based Bloom filter for the particular key-value entry.

18. The system of claim 14, wherein the determining that the particular page is in the particular table includes using a per table based Bloom filter for the particular key-value entry.

19. The system of claim 11, wherein the method further comprises:
providing a RAM table for storing recently used key-value entries, the RAM table including cache pages, each of the cache pages being configured to address a cache range of key space, the cache range being addressed by at least two pages from a first table in the stack;
placing the RAM table at a top of the stack;
determining full pages in the RAM table; and
in response to the determination, flushing key-values entries from the full pages to the tables in the stack.

20. A non-transitory computer-readable storage medium having embodied thereon instructions, which, when executed by one or more processors, perform a method comprising:
providing a stack of tables, wherein each of the table includes a set of pages of a pre-determined size, wherein each of the pages is configured to store a set of key-value entries and each of the key-value entries includes a key and a value;
monotonically decreasing a number of pages in the tables according to a position of the table in the stack; and
configuring each of the pages in the tables to address a particular range of a key space, wherein each of the pages in a subsequent table in the stack is configured to address a key space range addressed by at least two pages in a preceding table in the stack.

* * * * *